(12) United States Patent
Campbell

(10) Patent No.: US 10,862,699 B2
(45) Date of Patent: Dec. 8, 2020

(54) SENSOR COMMUNICATIONS BY VIBRATIONS

(71) Applicant: Hewlett-Packard Development Company, L.P., Houston, TX (US)

(72) Inventor: Robert Campbell, Cupertino, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 571 days.

(21) Appl. No.: 15/567,332

(22) PCT Filed: Jul. 24, 2015

(86) PCT No.: PCT/US2015/042011
§ 371 (c)(1),
(2) Date: Oct. 17, 2017

(87) PCT Pub. No.: WO2017/018994
PCT Pub. Date: Feb. 2, 2017

(65) Prior Publication Data
US 2018/0109393 A1 Apr. 19, 2018

(51) Int. Cl.
*H04L 12/28* (2006.01)
*H04B 11/00* (2006.01)
*H04B 13/00* (2006.01)
*G08B 27/00* (2006.01)
*G08B 29/18* (2006.01)

(52) U.S. Cl.
CPC .......... *H04L 12/283* (2013.01); *G08B 27/005* (2013.01); *G08B 29/185* (2013.01); *H04B 11/00* (2013.01); *H04B 13/00* (2013.01); *H04L 12/2803* (2013.01); *H04L 2012/284* (2013.01)

(58) Field of Classification Search
USPC ........................................................ 709/230
See application file for complete search history.

(56) References Cited

U.S. PATENT DOCUMENTS

| | | | |
|---|---|---|---|
| 6,208,247 B1 | 3/2001 | Agre et al. | |
| 7,286,964 B2 | 10/2007 | Kim | |
| 8,461,725 B1 | 6/2013 | Stubbs et al. | |
| 8,638,253 B1 | 1/2014 | Dryer | |
| 9,009,805 B1 | 4/2015 | Kirkby et al. | |
| 9,020,646 B2 | 4/2015 | Matsuoka et al. | |
| 9,326,094 B2* | 4/2016 | Johnson | E05B 47/026 |
| 9,336,677 B2* | 5/2016 | Rakib | H02J 3/385 |

(Continued)

FOREIGN PATENT DOCUMENTS

| | | |
|---|---|---|
| CN | 102487319 | 6/2012 |
| CN | 104104779 | 10/2014 |

(Continued)

*Primary Examiner* — Alicia Baturay
(74) *Attorney, Agent, or Firm* — Dierker & Kavanaugh

(57) ABSTRACT

In an example implementation, a sensor communication system includes a sensor to sense a condition and to include the condition in a message formatted in a communication protocol. The system includes a vibration actuator placed in contact with a building structure and operatively coupled to the sensor. The vibration actuator is to transmit the formatted message through the building structure as a vibration pattern, and an accelerometer is to detect the vibration pattern. A receiver hub coupled to the accelerometer is to decipher the condition from the vibration pattern.

15 Claims, 4 Drawing Sheets

(56) References Cited

U.S. PATENT DOCUMENTS

| | | | |
|---|---|---|---|
| 9,514,618 B2* | 12/2016 | Kizuki | H04M 1/72533 |
| 9,965,935 B2* | 5/2018 | Palmer | H02J 3/02 |
| 10,431,055 B2* | 10/2019 | Palmer | G08B 6/00 |
| 2006/0001540 A1* | 1/2006 | Staples | A01G 25/167 |
| | | | 340/539.26 |
| 2007/0188322 A1 | 8/2007 | English et al. | |
| 2010/0075619 A1* | 3/2010 | Solla | A42B 3/30 |
| | | | 455/90.3 |
| 2011/0053577 A1 | 3/2011 | Lee et al. | |
| 2012/0319866 A1 | 12/2012 | Syoen et al. | |
| 2013/0329526 A1 | 12/2013 | Rakib | |
| 2015/0062086 A1* | 3/2015 | Nattukallingal | G06F 3/016 |
| | | | 345/175 |
| 2015/0127712 A1 | 5/2015 | Fadell et al. | |
| 2016/0238237 A1* | 8/2016 | Palmer | F21V 7/28 |
| 2016/0371957 A1* | 12/2016 | Ghaffari | G01M 3/2807 |
| 2018/0098201 A1* | 4/2018 | Torello | G06T 5/50 |
| 2018/0307326 A1* | 10/2018 | Hoggeg | G06F 3/0202 |
| 2019/0170603 A1* | 6/2019 | Gupte | G01M 3/24 |
| 2020/0062542 A1* | 2/2020 | Sudi | B66B 1/3492 |

FOREIGN PATENT DOCUMENTS

| | | | |
|---|---|---|---|
| JP | 2012205294 A | 10/2012 | |
| JP | 2012-205294 A | 10/2013 | |
| KR | 10-2012-0110591 A | 10/2012 | |

* cited by examiner

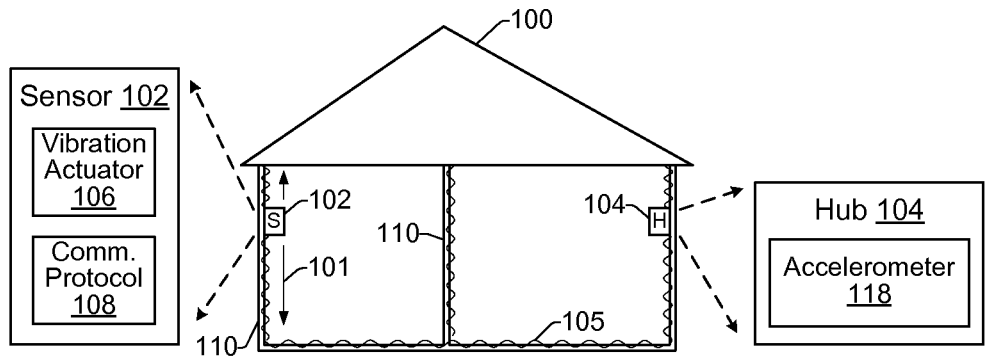
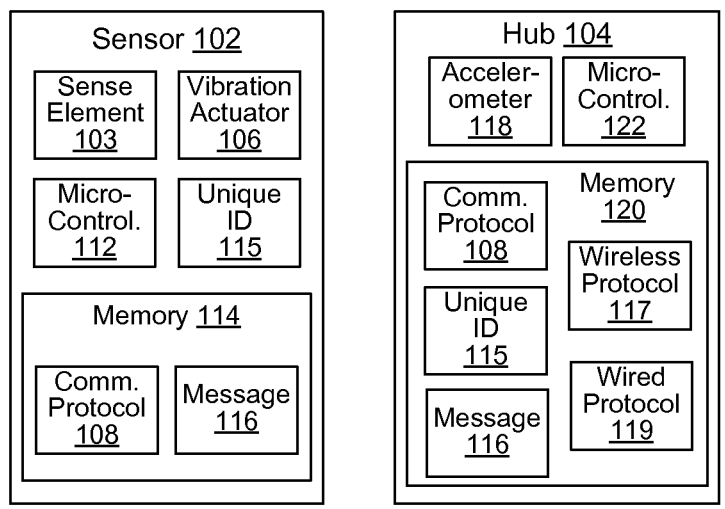
FIG. 1
FIG. 2

SENSOR COMMUNICATIONS BY VIBRATIONS

BACKGROUND

Automation systems for residential homes and commercial buildings offer wide variety of features that can help to provide security, energy efficiency, comfort, and convenience. The growing number of features and improving ease of use, along with decreasing costs continue to drive the popularity of such systems.

BRIEF DESCRIPTION OF THE DRAWINGS

Examples will now be described with reference to the accompanying drawings, in which:

FIG. 1 shows an example sensor communication system in which components of the system communicate using vibrations conducted through a building structure;

FIG. 2 shows details of an example sensor and example hub that are not shown in the example sensor communication system of FIG. 1;

Throughout the drawings, identical reference numbers designate similar, but not necessarily identical, elements.

DETAILED DESCRIPTION

Figure 3:
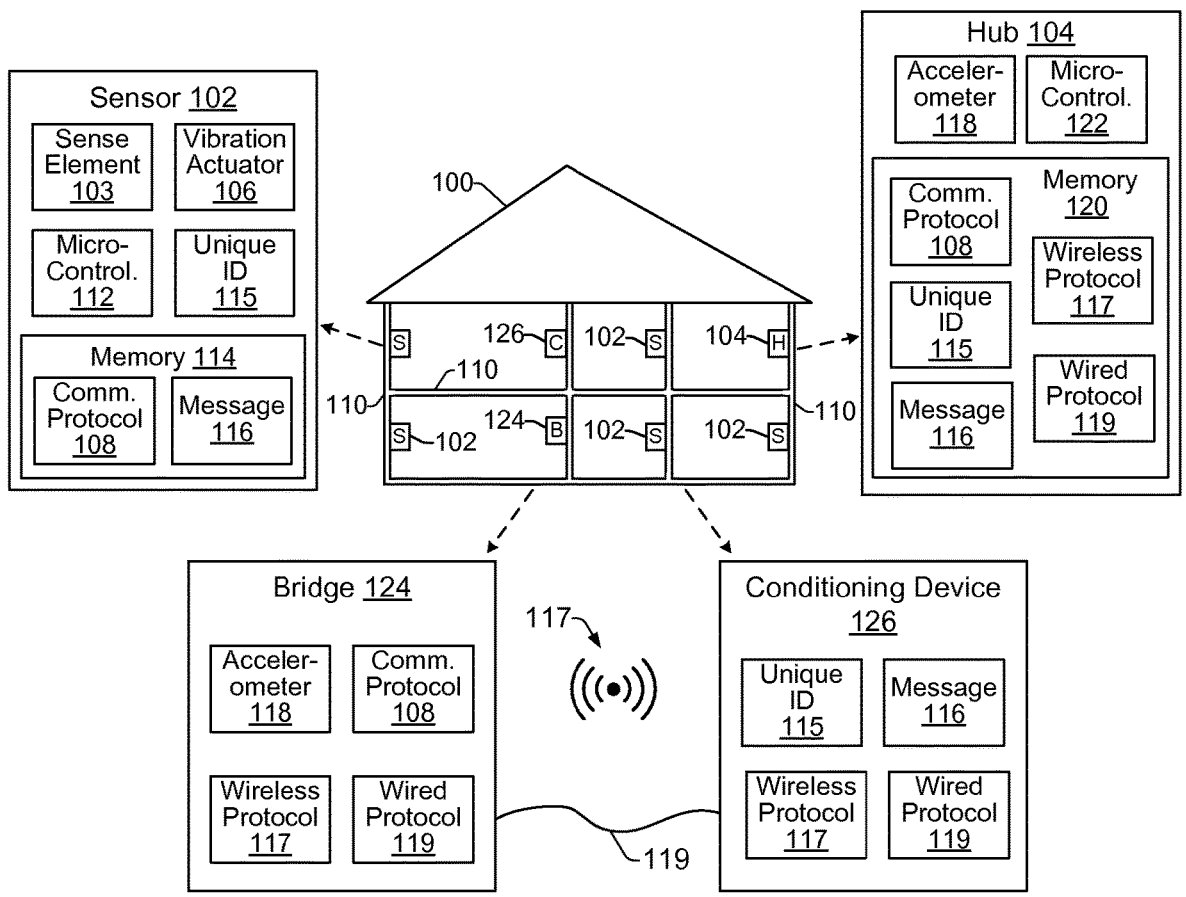
FIG. 3 shows an example sensor communication system that includes both a hub and a separate bridge device.

Automation systems can be remotely and locally managed using an array of devices such as smartphones, tablet computers, and laptops. The operation and success of such home and commercial automation systems is based on the information collected by sensors within the homes or buildings in which the systems are installed.

The collection of information by sensors is the basis of operation for home and building automation systems. Current home automation sensors communicate through a variety of wired or wireless protocols. For example, ZigBee, Z-wave, WiFi, Bluetooth, Insteon, Itron, and RadioRA2 are just some of the wireless communication protocols competing in the home automation space. These wireless communications specifications are generally designed to facilitate home automation by allowing devices such as home sensors, appliances, thermostats, lighting, and entertainment systems to communicate. The wireless radios implementing these protocols are optimized for power efficiency to allow battery powered sensors to operate for years on a single battery. However, these protocols and radios can be expensive and have operating range issues. In addition, in order to have a comprehensive home automation bridge that can effectively bridge devices from different manufacturers, a bridge or hub product may use up to eight wireless radios (e.g., ZigBee, Z-wave, etc.) for multi-protocol support, as well as have a complex antenna design and other costly hardware.

Accordingly, examples described herein provide for sensors and sensor communications that use a physical communication path to reduce the reliance of home automation systems on such wireless communication protocols and costly hardware. Low power sensors can incorporate a vibration actuator that can tap, buzz, or otherwise vibrate messages through the structure of a home or building using any communication protocol. Sensor messages can include, for example, a sensed condition (e.g., an open window, a temperature, the presence of carbon monoxide, etc.), and a unique identifier of the sensor. The sensor messages can be formatted using any communication protocol and encoded as a vibration pattern, including wireless protocols such as ZigBee, Z-wave, WiFi, and Bluetooth, or other protocols such as Morse code or protocols not yet known.

A receiver, such as a home automation hub or bridge, can detect the vibrated messages using a sensitive accelerometer. The hub or bridge can determine the information in the message from the vibration pattern of the message. In some examples, the bridge or hub can generate an acknowledgement message and transmit the acknowledgement message by vibration through the structure of the building, where the sensor can detect it with its own accelerometer. In some examples, the bridge or hub can translate the message from the vibration pattern in which it was initially transmitted through the physical structure of the building, into a wireless protocol message that it can re-transmit wirelessly. A wireless conditioning device, such as a thermostat, can receive the message wirelessly and determine the sensed condition from the message. Based on the sensed condition, the conditioning device can initiate an action to address the condition.

In an example implementation, a sensor communication system includes a sensor to sense a condition, and to include the condition in a message formatted n a communication protocol. The sensor communication system includes a vibration actuator that is in contact with a building structure and operatively coupled to the sensor. The vibration actuator is to transmit the formatted message through a vibration pattern. The system includes an accelerometer to detect the vibration pattern. A receiver operatively coupled to the accelerometer is to decipher the condition from the vibration pattern.

In another example implementation, a method of sensor communication within a building structure includes receiving at a sensor, a stimulus that indicates a condition. The method includes generating a message that identifies the condition, and transmitting the message by a vibration pattern through the building structure. The method also includes detecting the vibration pattern with an accelerometer and deciphering the message from the vibration pattern to determine the condition.

In another example implementation, a sensor communication system includes a sensor device with an integrated vibration actuator to transmit a sensed condition through a building structure by vibrations. The system also includes a bridge device with an integrated vibration detecting accelerometer to detect the vibrations. A wireless protocol on the bridge device is to translate the vibrations to a wireless message and transmit the wireless message. A conditioning device is to receive the wireless message and determine the sensed condition from the wireless message.

FIG. 1 shows a basic illustration of an example sensor communication system in which the sensor 102 and hub 104 components of the system communicate using vibrations conducted through a building structure 100. FIG. 2 shows details of the sensor 102 and hub 104 that are not shown in FIG. 1. Referring generally to FIGS. 1 and 2, a building structure 100, such as a house, comprises the sensor 102 installed at a first location in the structure 100 and the hub 104 installed at a second location in the structure 100. The first and second locations can be any location in the building 100, and the illustration of the sensor 102 and hub 104 in FIG. 1 is not intended to limit where the sensor 102 and hub 104 can be located.

The sensor 102 can be any type of sensor that includes a sense element 103 (FIG. 2) to sense a condition or conditions that are within and/or related to the building structure 100. For example, the sense element 103 can comprise a motion sense element such as a passive infrared sense element that detects changes in infrared light radiation, an occupancy or presence sense element that operates in a similar manner to the motion sense element, a light sense element, a temperature sense element, a humidity sense element, a smoke and/or fire sense element, a carbon monoxide sense element, a flood and/or leak sense element, a proximity sense element, a contact sense element to sense the opening and closing of doors and windows, a glass break sense element, an energy use sense element, a sound or microphone sense element, a moisture sense element, combinations thereof, and so on.

As shown in FIGS. 1 and 2, the sensor 102 also includes a vibration actuator 106 and communication protocol 108. The vibration actuator 106 can be any actuator 106 suitable to implement a vibration pattern according to the communication protocol 108, and to transmit the vibration pattern throughout the building structure 100 through vibrations 105. The vibrations 105 are shown in FIG. 1 originating with sensor 102 and emanating out (see direction arrows 101) from the sensor 102 through the building structure 100 toward the hub 104. Thus, while it is mentioned above that the location of the sensor 102 can be anywhere within or on the building structure 100, the vibration actuator 106 of the sensor 102 is to be placed in contact with or affixed to a firm and/or solid part of the structure 100 to facilitate the transmission of a vibration pattern as vibrations 105 into and throughout the building structure. A firm and/or solid part of the structure 100 can include, for example, a wall 110, a stud, a counter top, a wood or tile floor, and so on. In some examples, where the vibration actuator 106 comprises an integral part of the sensor 102, the sensor 102 itself is to be placed in contact with or affixed to a firm and/or solid part of the structure 100. Thus, as shown in the example in FIG. 1, the sensor 102 is attached to a wall 110 of structure 100. However, in other examples, where the vibration actuator 106 is coupled to the sensor in some other manner, such as by a wire, at least the vibration actuator 106 is to be placed in contact with or affixed to a firm and/or sold part of the structure 100, while the sensor 102 may not be.

The communication protocol 108 can comprise any protocol suitable for encoding or formatting a sensor message, including wireless protocols such as ZigBee, Z-wave, WiFi, and Bluetooth or other protocols such as Morse code or protocols not yet known.

As shown in FIG. 2, the sensor 102 can also include a processor or micro-controller 112 and a memory 114. The communication protocol 108 may comprise instructions stored in memory 114 that are executable by the micro-controller 112 to perform certain sensor functions. For example, the communication protocol 108 can include instructions that are executable to encode information in a message 116. Information encoded into message 116 through communication protocol 108 can include, for example, a condition sensed by the sense element 103 of sensor 102 and the unique identifier (ID) 115 of sensor 102. A unique ID 115 can comprise a unique identifier associated with a communication chip set implementing the communication protocol 108. In different examples, a unique ID 115 may comprise a MAC address (media access control address), an IMEI (International Mobile Equipment Identity) ID, an IMS (International Mobile Subscriber) ID, or other unique identifier that includes, for example, some combination of information identifying the sensor 102.

The memory 114 can include both volatile and nonvolatile memory components comprising non-transitory, machine-readable (e.g., computer/processor-readable) media that provide for the storage of machine-readable, coded programming instructions, data structures, program instruction modules, applications, and other data, such as communication protocol 108 and sensor message 114.

The hub 104 comprises a receiver for receiving a message 116 from a sensor 102. In some examples, the hub 104 comprises a bridge to translate the form of a message 116 from a physical vibration form to a wireless protocol 117 form, or a wired protocol 119 form, as discussed below with regard to FIG. 3. In general, the wireless protocol 117 form or wired protocol 119 form mill depend on whether conditioning device 126 (FIG. 3) is hard wired to, or wirelessly coupled to, the bridge device 124.

The hub 104 comprises an accelerometer 118 that functions as a vibration detector. The accelerometer 118 is capable of detecting a message 116 that is transmitted through the building structure 110 from a sensor 102 in the form of vibrations 105. The accelerometer 118 may comprise, for example, a micro electrical-mechanical systems (MEMS) device available on a single monolithic integrated circuit (IC). Recent advances in such devices have enabled their use for acceleration and tilt measurements, vibration control, and switching applications. In some examples, a signal-conditioning circuit (not shown) may be used to provide filtering of the vibrations. The accelerometer 118 is to be placed in contact with or affixed to a firm and/or solid part of the structure 100 to facilitate detection of vibrations transmitted through the building structure 100. As noted above, a firm and/or solid part of the structure 100 can include, for example, a wall 110, a stud, a counter top, a wood or the floor, and so on. In some examples, where the accelerometer 118 comprises an integral part of the receiver hub 104, the receiver hub 104 itself is to be placed in contact with or affixed to a firm and/or solid part of the structure 100. Thus, as shown in the example in FIG. 1, the hub 104 is attached to a wall 110 of structure 100. However, in other examples where the accelerometer 118 is coupled to the hub 104 in some other manner, such as by a wire, at least the accelerometer 118 is to be placed in contact with or affixed to a firm and/or sold part of the structure 100, while the hub 104 may not be.

Upon detecting the message vibrations 105, the receiver hub 104 can implement the communication protocol 108 to decipher the message 116. The communication protocol 108 may comprise instructions stored in memory 120 that are executable by a micro-controller 122 to determine information from the message 116, including a condition previously sensed by sensor 102 and a unique ID 115 of sensor 102. The memory 120 can include both volatile and nonvolatile memory components comprising non-transitory, machine-readable (e.g., computer/processor-readable) media that provide for the storage of machine-readable, coded programming instructions, data structures, program instruction modules, applications, and other data, such as communication protocol 108 and sensor message 116.

As noted above, in some examples the hub 104 comprises a bridge that can translate the fore of a message 116 from a physical vibration form to a wireless protocol 117 form, or a wired protocol 119 form. In some examples, the sensor communication system includes both a hub 104 and a separate bridge device 124, as shown in FIG. 3. In either case, a bridge device 124 is to bridge the message 116 from its transmitted form (i.e., vibrations 105) into a different form useful by another system device. In the example shown in FIG. 3, a conditioning device 126 is a wireless 117 or wired 119 device that does not communicate through vibrations transmitted through the building structure 100. That is, it does not employ an accelerometer 118 and does not detect message vibrations 105. Instead, the conditioning device 126 communicates through a wireless protocol 117, such as ZigBee, Z-wave, Blue Tooth, and WiFi, or a wired protocol 119. Accordingly, the bridge device 124, or the hub 104 operating as a bridge device (in some examples), is to receive the message 116 by detecting the message vibration pattern 105 from sensor 102 with an accelerometer 118. The bridge device 124 translates the message 116 from the vibration pattern form into a less protocol 117 form or wired protocol 119 form, and transmits the message 116 wirelessly 117 or over a wire 119. Translation of the message 116 out of the vibration pattern into a wireless or wired protocol form, enables the wireless conditioning device 126 to receive the message 116 and to determine the condition sensed by the sensor 102. The conditioning device 126 can then take an action to address the condition. An example of such an action can be a temperature conditioning device 126 increasing cool air flow to the room within the building structure 100 where the sensor 102 sensed a high temperature condition.

Figure 4:
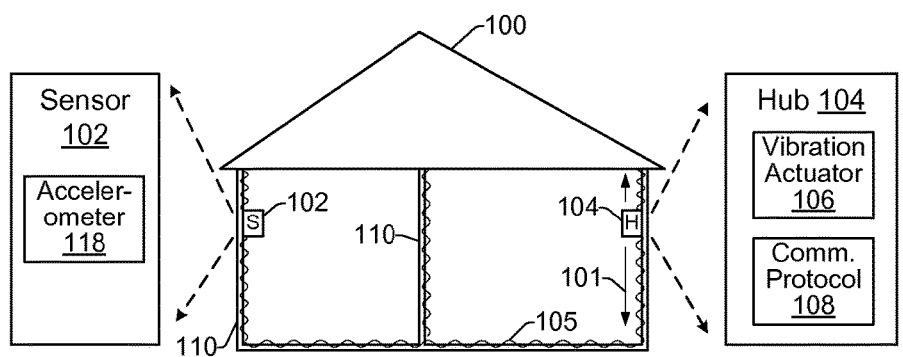
FIG. 4 shows a basic illustration of an example sensor communication system in which components of the system communicate using vibrations conducted through a building structure.

The discussion above with regard to FIGS. 1-3 has been primarily focused on uni-directional vibration communication from a sensor 102 to the hub 104. However, as shown in FIG. 4, the vibration communication can also emanate from the hub 104 and be detected at a sensor 102. The vibrations 105 are shown in FIG. 4 originating with the hub 104 and emanating out (see direction arrows 101) from the hub 104 through the building structure 100 toward the sensor 102. Thus, the hub 104 is shown in FIG. 4 as including a vibration actuator 106 and a communication protocol 108, so that the vibration actuator 106 can implement vibration patterns according to the communication protocol 108 and transmit the through the building structure 100 to devices such as sensor 102. Vibrated messages from the hub 104 to a sensor 102 can include acknowledgement messages that acknowledge that the hub 104 has received a message from the sensor 102. Other messages emanating from the hub 104 can include, for example, messages that request the status of the sensor to determine if the sensor remains functional. In general, bi-directional vibrational communication between a sensor 102 and hub 104, or between other devices throughout the building structure 100, means that each device involved in the vibrational communication will comprise both a vibrational actuator 106 for generating vibrational patterns and an accelerometer 118 for detecting vibrational patterns.

Figure 5:
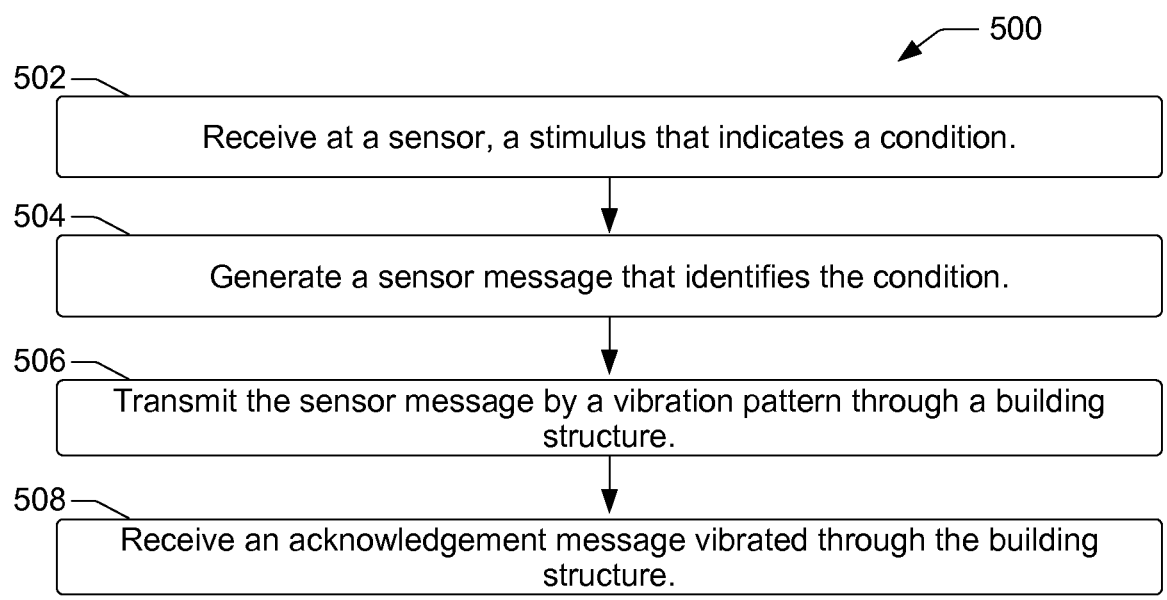
FIG. 5 shows a flow diagram that illustrates an example method of sensor communication in a building structure.
Figure 6:
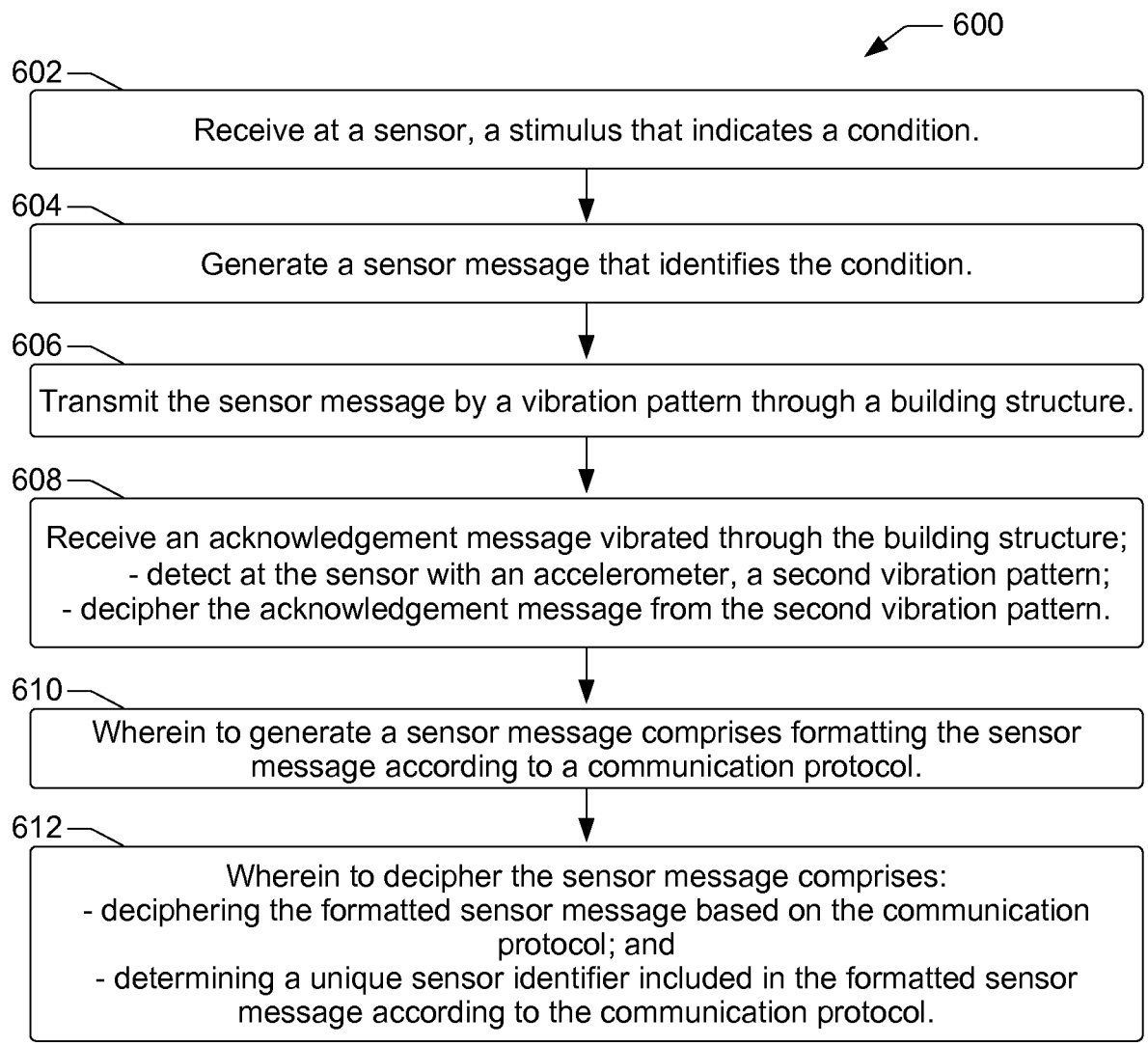
FIG. 6 shows a flow diagram that illustrates another example method of sensor communication in a building structure.

FIGS. 5 and 6 show flow diagrams that illustrate example methods 500 and 600, respectively, of communicating in a sensor communication system. Methods 500 and 600 are associated with examples discussed above with regard to FIGS. 1-4, and details of the operations shown in methods 500 and 600 can be found in the related discussion of such examples. The operations of methods 500 and 600 may be embodied as programming instructions stored on a non-transitory, machine-readable (e.g., computer/processor-readable) medium, such as memory 114 and memory 120 shown in FIG. 2. In some examples, implementing the operations of methods 500 and 600 can be achieved by a processor, such as processor 112 and processor 122 of FIG. 2, by reading and executing the programming instructions stored in memories 114 and 120, respectively. In some examples, implementing the operations of methods 500 and 600 can be achieved using an ASIC (not shown) and/or other hardware components alone or in combination with programming instructions executable by a processor 112 ands 122.

The methods 500 and 600 may include more than one implementation and different implementations of methods 500 and 600 may not employ every operation presented iii the flow diagrams of FIGS. 5 and 6. Therefore, while the operations of methods 500 and 600 are presented in a particular order within the flow diagrams, the order of their presentation is not intended to be a limitation as to the order in which the operations may actually be implemented, or as to whether all of the operations may be implemented. For example, one implementation of method 500 might be achieved through the performance of a number of initial operations, without performing some of the subsequent operations, while another implementation of method 600 might be achieved through the performance of all of the operations.

Referring now to the flow diagram of FIG. 5, an example method 500 of communicating in a sensor communication system begins at block 502, with receiving at a sensor, a stimulus that indicates a condition. The condition can be any sensed condition such as a temperature. As shown at block 504, the method 500 continues with generating a sensor message that identifies the condition. The sensor message can then be transmitted by a vibration pattern through a building structure, as shown at block 506. As shown at block 508, the method 500 can continue with receiving an acknowledgement message vibrated through the building structure.

Referring now to the flow diagram of FIG. 6, another example method 600 of communicating in a sensor communication system begins at block 602, with receiving at a stimulus at a sensor that indicates a condition. The method 600 continues at block 604 with generating a sensor message that identifies the condition. As shown at block 606, the sensor message can then be transmitted by a vibration pattern through a building structure. As shown at block 608, an acknowledgement message is received that has been vibrated through the building structure. In some examples, receiving the acknowledgement message includes detecting at the sensor with an accelerometer, a second vibration pattern, and deciphering the acknowledgement message from the second vibration pattern.

As shown at block 610, in some examples, generating a sensor message comprises formatting the sensor message according to a communication protocol. As shown at block 612, in some examples, deciphering the sensor message comprises deciphering the formatted sensor message based on the communication protocol and determining a unique sensor identifier included in the formatted sensor message according to the communication protocol.

What is claimed is:

1. A sensor communication system comprising:
a sensor to sense a condition and to include the condition in a message formatted in a communication protocol;
a vibration actuator placed in contact with a building structure and operatively coupled to the sensor, the vibration actuator to transmit the formatted message through the building structure as a vibration pattern;
an accelerometer to detect the vibration pattern; and a receiver hub operatively coupled to the accelerometer to decipher the condition from the vibration pattern.

2. A sensor communication system as in claim 1, wherein the accelerometer is placed in contact with the building structure.

3. A sensor communication system as in claim 1, wherein the sensor comprises a sense element selected from the group consisting of a smoke sense element, a carbon monoxide sense element, a window sense element, a door sense element, a moisture sense element, a temperature sense element, a motion sense element, a light sense element, a wind sense element, and combinations thereof.

4. A sensor communication system as in claim 1, wherein the communication protocol is selected from the group consisting of ZigBee, Z-wave, WiFi, Bluetooth, Insteon, Itron, RadioRA2, and Morse code.

5. A sensor communication system as in claim 1, further comprising:
a second vibration actuator in contact with the building structure and operatively coupled to the receiver hub, the second vibration actuator to transmit an acknowledgement of receipt message through the building structure as a vibration pattern.

6. A sensor communication system as in claim 1, wherein the receiver hub comprises a bridge, the system further comprising:
a wireless protocol executable on the bridge to format the message as a wireless protocol message and to transmit the wireless protocol message; and
a wireless conditioning device to receive the wireless protocol message, determine from the message the condition sensed by the sensor, and initiate a response to the condition.

7. A sensor communication system as in claim 1, wherein the accelerometer comprises a micro electrical-mechanical systems device formed on a single monolithic integrated circuit.

8. A non-transitory machine-readable storage medium storing instructions for communicating in a sensor communication system, the instructions that when executed by a processor of the system, cause the system to:
receive at a sensor, a stimulus that indicates a condition;
generate a sensor message that identifies the condition;
transmit the sensor message by a vibration pattern through a building structure; and
receive an acknowledgement message vibrated through the building structure.

9. A non-transitory machine-readable storage medium as in claim 8, the instructions further causing the system to:
detect the vibration pattern with an accelerometer; and
decipher the sensor message from the vibration pattern to determine the condition.

10. A non-transitory machine-readable storage medium as in claim 8, wherein to receive an acknowledgement message comprises:
detecting at the sensor with an accelerometer, a second vibration pattern; and
deciphering the acknowledgement message from the second vibration pattern.

11. A non-transitory machine-readable storage medium as in claim 9, wherein to generate a sensor message comprises formatting the sensor message according to a communication protocol.

12. A non-transitory machine-readable storage medium as in claim 11, wherein to decipher the sensor message comprises:
deciphering the formatted sensor message based on the communication protocol; and
determining a unique sensor identifier included in the formatted sensor message according to the communication protocol.

13. A sensor communication system comprising:
a sensor device with an integrated vibration actuator to transmit a sensed condition through a building structure by vibrations;
a bridge device with an integrated vibration detecting accelerometer to detect the vibrations;
a wireless protocol on the bridge device to translate the vibrations to a wireless message and to transmit the wireless message; and
a conditioning device to receive the wireless message and determine the sensed condition from the wireless message.

14. A sensor communication system as in claim 13, wherein:
the sensor device comprises a communication protocol to format a message to contain the sensed condition and a unique identifier of the sensor device; and
the bridge device comprises the communication protocol to determine the sensed condition and unique identifier from the formatted message.

15. A sensor communication system as in claim 14, further comprising:
a hub with an integrated vibration detecting accelerometer to detect the vibrations and a communication protocol to determine the sensed condition and unique identifier from the formatted message.

* * * * *